US006317750B1

United States Patent
Tortolani et al.

(10) Patent No.: US 6,317,750 B1
(45) Date of Patent: Nov. 13, 2001

(54) METHOD AND APPARATUS FOR ACCESSING MULTIDIMENSIONAL DATA

(75) Inventors: Thomas R. Tortolani, Castro Valley; Koorosh M. Nouri, Foster City, both of CA (US)

(73) Assignee: Hyperion Solutions Corporation, Sunnyvale, CA (US)

( * ) Notice: Subject to any disclaimer, the term of this patent is extended or adjusted under 35 U.S.C. 154(b) by 0 days.

(21) Appl. No.: 09/178,059

(22) Filed: Oct. 26, 1998

(51) Int. Cl.[7] .................................................... G06F 17/00
(52) U.S. Cl. ............................ 707/103; 707/102; 707/3; 707/4; 707/5; 345/335; 345/355
(58) Field of Search ............................. 707/3, 4, 5, 101, 707/103, 104, 503; 706/11; 345/335, 355

(56) References Cited

U.S. PATENT DOCUMENTS

| | | | |
|---|---|---|---|
| 5,463,724 | * 10/1995 | Anderson et al. | 707/503 |
| 5,471,612 | * 11/1995 | Schlafly | 707/104 |
| 5,603,021 | * 2/1997 | Spencer et al. | 707/4 |
| 5,604,854 | * 2/1997 | Glassey | 707/503 |
| 5,680,613 | * 10/1997 | Atsumi | 707/103 |
| 5,767,854 | * 6/1998 | Amwar | 345/355 |
| 5,845,270 | * 12/1998 | Schatz et al. | 706/11 |
| 5,883,623 | * 3/1999 | Cseri | 345/335 |
| 5,918,232 | * 6/1999 | Pouschine et al. | 707/103 |
| 6,002,865 | * 12/1999 | Thomsen | 707/3 |
| 6,094,651 | * 7/2000 | Agrawal et al. | 707/5 |
| 6,112,209 | * 8/2000 | Gusack | 707/101 |

OTHER PUBLICATIONS

Microsoft Excel, PivotTables: Analyzing data interactively.
Oracle Corporation, Oracle Express Objects User's Guide, Release 2.1, 1997.
Oracle Corporation, Oracle Express Web Agents User's Guide, Release 1.2, 1997.

* cited by examiner

*Primary Examiner*—Hosain T. Alam
*Assistant Examiner*—Anh Ly
(74) *Attorney, Agent, or Firm*—Beyer Weaver & Thomas, LLP

(57) ABSTRACT

Retrieving multidimensional data from a data source and displaying the data in a familiar and pre-existing user interface automatically propagates user-created formulas thereby eliminating the need for users to re-enter formulas. A data representation of the multidimensional data is sent to a query processor which creates row and column structures. These structures are manipulated based on a user action, such as zoom-in, and a multidimensional data output tree showing a hierarchy of the multidimensional data. Also created is a blueprint containing instructions on insertions and deletions to be carried out by the program associated with the pre-existing user interface, such as a spreadsheet program. Once the blueprint is interpreted by the program, typically through a data representation manipulator or common spreadsheet layer, the user interface is configured to accommodate the returned multidimensional data. Once the user interface is populated with the data, the program, such as the spreadsheet program, adjusts the user-created formula cell designations to reflect the new configuration.

38 Claims, 9 Drawing Sheets

| | A | B | C | D | E | F | G | H | I | J |
|---|---|---|---|---|---|---|---|---|---|---|
| 1 | | | Product | Scenario | | | | | | |
| 2 | | | | | | | | | | |
| 3 | | | Qtr1 | % | Qtr2 | % | Qtr3 | % | Qtr4 | % |
| 4 | | | | | | | | | | |
| 5 | East | Sales | 22062 | 1 | 2249 | 1 | 22976 | 1 | 21352 | 1 |
| 6 | | COGS | 9080 | 0.440327821 | 9585 | 0.426967794 | 10064 | 0.438022284 | 9198 | 0.430779318 |
| 7 | | Margin | 11541 | 0.559672179 | 12864 | 0.573032206 | 12912 | 0.561977716 | 12154 | 0.569220682 |
| 8 | | Total Expenses | 6161 | 0.298773095 | 9365 | 0.28353156 | 6566 | 0.285776462 | 6218 | 0.291213938 |
| 9 | West | Sales | 31674 | 1 | 33572 | 1 | 35130 | 1 | 32555 | 1 |
| 10 | | COGS | 14850 | 0.468838795 | 15922 | 0.474264268 | 16740 | 0.476515798 | 15393 | 0.472830594 |
| 11 | | Margin | 16824 | 0.531161205 | 17650 | 0.525735732 | 18390 | 0.523484202 | 17162 | 0.527169406 |
| 12 | | Total Expenses | 9687 | 0.305834438 | 10135 | 0.301888478 | 10451 | 0.297495019 | 9892 | 0.303855015 |
| 13 | South | Sales | 12113 | 1 | 12602 | 1 | 13355 | 1 | 12776 | 1 |
| 14 | | COGS | 5223 | 0.431189631 | 5442 | 0.434518907 | 5803 | 0.434518907 | 5482 | 0.429085786 |
| 15 | | Margin | 6890 | 0.568810369 | 7160 | 0.565481093 | 7552 | 0.565481093 | 7294 | 0.570914214 |
| 16 | | Total Expenses | 3813 | 0.314785767 | 3893 | 0.302283789 | 4037 | 0.302283789 | 3915 | 0.306433939 |
| 17 | Central | Sales | 31412 | 1 | 33056 | 1 | 33754 | 1 | 31458 | 1 |
| 18 | | COGS | 13724 | 0.436903094 | 14413 | 0.436570481 | 14736 | 0.436570481 | 13681 | 0.434897323 |
| 19 | | Margin | 17688 | 0.563096906 | 18643 | 0.563429519 | 19018 | 0.563429819 | 17777 | 0.565102677 |
| 20 | | Total Expenses | 8579 | 0.273112186 | 8817 | 0.26385021 | 8906 | 0.26385021 | 8562 | 0.27217242 |

FIG. 1A

| | A | B | C | D | E | F | G | H | I |
|---|---|---|---|---|---|---|---|---|---|
| | A1 | | | | | | | | |
| 1 | | Product | Market | Scenario | | | | | |
| 2 | | | | | | | | | |
| 3 | | Qtr1 | Qtr2 | Qtr3 | Qtr4 | Year | | | |
| 4 | Sales | 95820 | 101679 | 105215 | 98141 | 400855 | | | |
| 5 | COGS | 42877 | 45362 | 47343 | 43754 | 179336 | | | |
| 6 | Margin | 52943 | 56317 | 57872 | 54387 | 221519 | | | |
| 7 | Total Expenses | 28240 | 29210 | 29960 | 28587 | 115997 | | | |
| 8 | | | | | | | | | |
| 9 | | | | | | | | | |

Sheet1 / Sheet2 / Sheet3 / Sheet4 /

FIG. 1B

| | A | B | C | D | E | F | G | H | I | J |
|---|---|---|---|---|---|---|---|---|---|---|
| | C6 | =B6/B5 | | | | | | | | |
| 1 | | Product | Market | Scenario | | | | | | |
| 2 | | | | | | | | | | |
| 3 | | Qtr1 | % | Qtr2 | % | Qtr3 | % | Qtr4 | % | Year |
| 4 | Sales | 95820 | 1 | 101679 | 1 | 105215 | 1 | 98141 | 1 | 400855 |
| 5 | COGS | 42877 | 0.447474431 | 45362 | 0.446129486 | 47343 | 0.449964359 | 43754 | 0.445827941 | 179336 |
| 6 | Margin | 52943 | 0.552525569 | 56317 | 0.553870514 | 57872 | 0.550035641 | 54687 | 0.554172059 | 221519 |
| 7 | Total Expenses | 28240 | 0.294719265 | 29210 | 0.287276625 | 29960 | 0.284750273 | 28587 | 0.291284988 | 115997 |
| 8 | | | | | | | | | | |
| 9 | | | | | | | | | | |

102 { =B6/B5
104 { C6

Sheet1 / Sheet2 / Sheet3 / Sheet4 / Sheet5 / Sheet6 / She

| | A | B | C | D | E | F | G | H | I | J |
|---|---|---|---|---|---|---|---|---|---|---|
| 1 | | | Product | Scenario | | | | | | |
| 2 | | | | | | | | | | |
| 3 | | | Qtr1 | % | Qtr2 | % | Qtr3 | % | Qtr4 | % |
| 4 | | | | | | | | | | |
| 5 | East | Sales | 220621 | 1 | 2249 | 1 | 22976 | 1 | 21352 | 1 |
| 6 | | COGS | 9080 | 0.440327821 | 9585 | 0.426967794 | 10064 | 0.438022284 | 9198 | 0.430779318 |
| 7 | | Margin | 11541 | 0.559672179 | 12864 | 0.573032206 | 12912 | 0.561977716 | 12154 | 0.569220682 |
| 8 | | Total Expenses | 6161 | 0.298773095 | 9365 | 0.28353156 | 6566 | 0.285776462 | 6218 | 0.291213938 |
| 9 | West | Sales | 31674 | 1 | 33572 | 1 | 35130 | 1 | 32555 | 1 |
| 10 | | COGS | 14850 | 0.468838795 | 15922 | 0.474264268 | 16740 | 0.476515798 | 15393 | 0.472830594 |
| 11 | | Margin | 16824 | 0.531161205 | 17650 | 0.525735732 | 18390 | 0.523484202 | 17162 | 0.527169406 |
| 12 | | Total Expenses | 9687 | 0.305834438 | 10135 | 0.301888478 | 10451 | 0.297495019 | 9892 | 0.303855015 |
| 13 | South | Sales | 12113 | 1 | 12602 | 1 | 13355 | 1 | 12776 | 1 |
| 14 | | COGS | 5223 | 0.431189631 | 5442 | 0.434518907 | 5803 | 0.434518907 | 5482 | 0.429085786 |
| 15 | | Margin | 6890 | 0.568810369 | 7160 | 0.565481093 | 7552 | 0.565481093 | 7294 | 0.570914214 |
| 16 | | Total Expenses | 3813 | 0.314785767 | 3893 | 0.302283789 | 4037 | 0.302283789 | 3915 | 0.306433939 |
| 17 | Central | Sales | 31412 | 1 | 33056 | 1 | 33754 | 1 | 31458 | 1 |
| 18 | | COGS | 13724 | 0.436903094 | 14413 | 0.436570481 | 14736 | 0.436570481 | 13681 | 0.434897323 |
| 19 | | Margin | 17688 | 0.563096906 | 18643 | 0.563429519 | 19018 | 0.563429519 | 17777 | 0.565102677 |
| 20 | | Total Expenses | 8579 | 0.273112186 | 8817 | 0.26385021 | 8906 | 0.26385021 | 8562 | 0.27217242 |

FIG. 1C

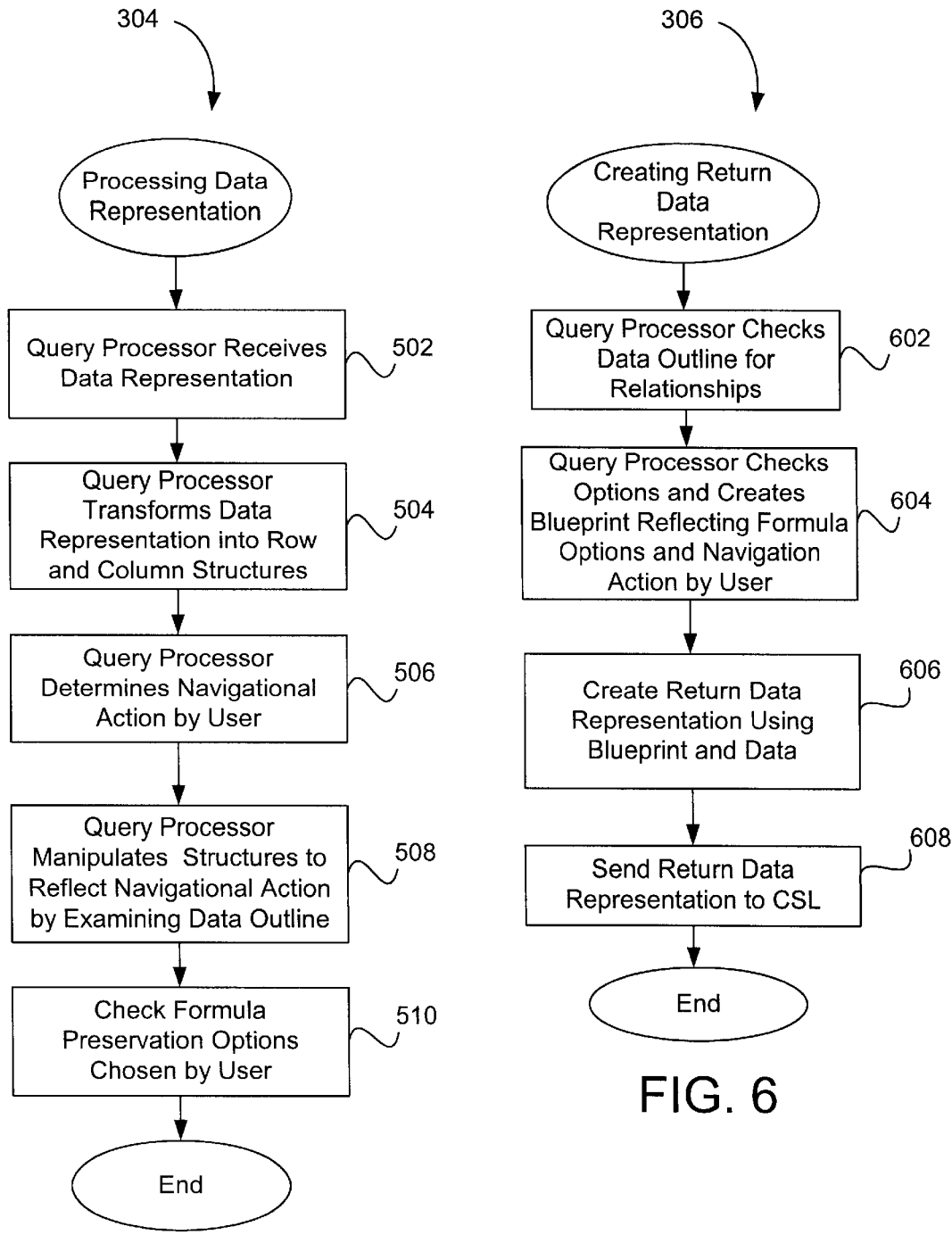

METHOD AND APPARATUS FOR ACCESSING MULTIDIMENSIONAL DATA

BACKGROUND OF THE INVENTION

1. Field of the Invention

The present invention relates generally to computer software, and, more particularly, to computer software for accessing, manipulating, and presenting data through a user interface.

2. Description of the Related Art

An important feature of any computer program, particularly end-user application programs, is its ability to interact with the user. How an application program allows a user to navigate, manipulate, retrieve, and display data is a critical component in the program's overall functionality. Often, the commercial success or failure of a software program can hinge on how easy it is for an end-user to actually use the software and, more specifically in some cases, how effectively and intelligently the data is displayed or presented to the user. More recently, while the expectations and sophistication of users has increased, users have disfavored programs in which repetitive data must be keyed into the program or in which obvious modifications to data are not made without prompting by a user. In short, as users' needs become more complex and as the users become more proficient with computer software, graphical and text based user interfaces should be easy to learn and be as intuitive or familiar as possible.

One general category of end-user application software, in which the user interface is an important component, addresses data storage, retrieval, and manipulation. One type of application within this category is often referred to as database management programs or simply database applications. Encompassed within this category are database systems referred to commercially as multidimensional databases or, in technical discussions, as Online Analytical Processing (OLAP) data stores. The OLAP paradigm is described in the white paper entitled "Providing OLAP (On-line Analytical Processing) to User-Analysts: An IT Mandate" by E. F. Codd, S. B. Codd, and C. T. Salley published by Codd & Date, Inc., and incorporated by reference herein for all purposes. Typically, a multidimensional database stores and organizes data in a way that better reflects how a user would want to view the data than is possible in a two-dimensional spreadsheet or relational database file. Multidimensional databases are better suited generally to handle applications with large volumes of numeric data and that require calculations on numeric data, such as business analysis and forecasting.

A dimension within multidimensional data is typically a basic categorical definition of data in a database outline (discussed in greater detail below). A multidimensional database can contain several dimensions thereby allowing analysis of a large volume of data from multiple viewpoints or perspectives. Thus, a dimension can also be described as a perspective or view of a specific dataset. A different view of the same data is referred to as an alternative dimension. A data management system that supports simultaneous, alternative views of datasets is said to be multidimensional. Using a business application as an example, dimensions are items such as TIME, ACCOUNTS, PRODUCT LINES, MARKETS, DIVISIONS, and so on. Within each dimension, there is typically a consolidation or other relationship between items.

A multidimensional database generally resides on a dedicated or shared server computer. The user interface resides on a front-end component, such as a client computer. With most multidimensional databases presently on the market, the format and functionality of the user interfaces are not all well-suited for complex business uses. Many of these user interfaces were not designed for performing high-volume numeric calculations or business analysis, the very attributes that make multidimensional databases inherently superior to other types of databases and data stores. Nor are they designed to allow easy and efficient navigation through data in a multidimensional database. In one sense the database and the user interface are too closely coupled and thus requires the user to learn a new interface and replace familiar interfaces with a foreign interface. An example of a multidimensional database with such a user interface is Express™ from Oracle Corporation of Foster City, Calif.

One type of user interface that improves on the basic, generally ill-suited interfaces accompanying multidimensional databases in recent years is one that utilizes widely recognized computer spreadsheet formats. A spreadsheet is used as a query tool to the multidimensional database. Many end-users using computers in a business environment and even those not in a business setting are more or less familiar with the concept of cells making up rows and columns in a spreadsheet format. Spreadsheet applications such as Excel™ from Microsoft Corporation of Redmond, Wash. and Lotus 1-2-3™ of IBM Corporation of Armonk, N.Y. are used widely in the business world and have been prevalent in the software market for nearly two decades. The user interface and format of such spreadsheet programs are very familiar to most business end-users, many of whom are potential users of multidimensional databases which store and organize the data displayed in the spreadsheet programs.

A multidimensional user interface utilizing a spreadsheet format is presently available from Hyperion Solutions Corporation of Sunnyvale, Calif. One feature of the spreadsheet user interface for multidimensional data navigation presently available is the ability to insert formulas in certain cells to express relationships among data in other cells. However, insertion of such formulas or formulaic relationships in one cell showing a particular relationship among values in other cells is confined only that one cell. Such formulaic relationships are not propagated or communicated to other portions of the multidimensional data as the data is retrieved from the database. Once a cell-based formulaic relationship is entered, it only applies to the cells explicitly entered by the user. However, it is likely that the user would want the same formulaic relationship to apply to cells holding the same type of value but having a different level of granularity. In a simple example, Table 1 shows two rows in a spreadsheet containing the following data:

TABLE 1

| | A | B | C | D | E |
|---|---|---|---|---|---|
| 1. | | # Of Items Sold | Price Per Item | Total Sales | |
| 2. | Entire Market | 256 | 38 | (B2*C2) | |
| 3. | | | | | |

The user inserts a formula in the last cell that provides the total sales amount for the entire country—data not available directly from the multidimensional database. Using the spreadsheet as a query tool, the user can click on, or zoom-in on, a market dimension (cell A2), causing the database to return members of the market dimension, such as, East, West, South, and Central. Presently, the total sales amount formula (B2*C2) is not propagated to each of the new rows even though the user would very likely want to see the total sales amount for each region, since he indicated that that data was desirable for national sales. The user has to key in the same formula in each cell after zooming in on the region dimension. This requires significant time typing in repetitive data and is error-prone.

Therefore, it would be desirable to have a user interface utilizing a spreadsheet that allows the user to create formulas in an ad hoc manner that uses multidimensional data and have those formulas propagate and replicate while the user is navigating through the multidimensional data. It would also be desirable to have the formulas propagate and replicate in an intuitive or intelligent manner and with reduced user intervention. Thus, there is a need for an automated and intelligent process for replicating user-entered formulas manipulate multidimensional data in a spreadsheet user interface.

SUMMARY OF THE INVENTION

Generally, the invention relates to improved techniques for displaying and retrieving multidimensional data using a spreadsheet user interface. This is achieved by propagation or removal of formulas throughout different views of the multidimensional data.

The invention can be implemented in numerous ways, including as a method, system, and computer-readable media. Several of the embodiments of the invention are discussed below.

As a method for presenting data including formulaic relationships using a cell-based user interface, an embodiment of the invention includes the acts of: retrieving an initial data representation of data in a cell-based or spreadsheet user interface, the initial data representation including a representation of a user data navigation operation; determining whether the initial data representation contains user-created formulaic relationships; creating a set of instructions to be performed by a cell-based or spreadsheet program associated with the user interface based on the user data navigation operation and user-created formulaic relationships; creating a return data representation including updated data from a data source to be displayed in the cell-based or spreadsheet user interface and a set of instructions to be performed by the cell-based or spreadsheet program; and performing the set of instructions thereby allowing any formulaic relationships to be automatically replicated and displayed in the cell-based user interface.

As a method for modifying a spreadsheet user interface to accommodate cell-based formula propagation, the spreadsheet user interface used to display multidimensional data, an embodiment of the invention includes the acts of: determining the number of rows and the number of columns to be either inserted or removed in the spreadsheet user interface; determining one or more locations in the spreadsheet user interface where rows and columns are to be inserted or removed; creating multiple spreadsheet instructions based on the number of rows and the number of columns and the one or more locations in the spreadsheet user interface where the rows and columns are to be inserted or deleted; and performing the spreadsheet instructions to modify the spreadsheet user interface thereby accommodating cell-based formula propagation.

As a method for automatically propagating user-created formulas following a user navigation through data of a database capable of being viewed in a multi-dimensional manner, an embodiment of the invention includes the acts of: displaying a view of an initial data set from the database, wherein the first view of the data set displays numeric data, and at least a portion of the numeric data results from a user-created formula; receiving a user navigation request with respect to the view of the initial data set; determining a view of a return data set from the database, wherein the view of the return data set has at least numeric data, and at least a portion of the numeric data results from propagating the user-created formula of the view of the initial data set to positions within the view of the return data set; and displaying the view of the return data set.

As a system for retrieving multidimensional data and displaying the multidimensional data in a spreadsheet program, an embodiment of the invention includes the following components: a spreadsheet program having a user interface; a data representation manipulator or common spreadsheet layer for creating and deciphering a data representation; a query processor for processing a user navigation operation encoded in the data representation and for accessing a multidimensional data outline; and a data source for storing data that is retrieved and displayed in the user interface.

BRIEF DESCRIPTION OF THE DRAWINGS

The invention may best be understood by reference to the following description taken in conjunction with the accompanying drawings, illustrating by way of example the principles of the invention, in which:

FIG. 1 is a screen display of a spreadsheet user interface containing multidimensional data from a data source;

FIG. 1B is a screen display of the spreadsheet user interface shown in FIG. 1 after having inserted a formula;

FIG. 1C is a screen display of a spreadsheet user interface showing data after the user has navigated through the data and after formulas entered by the user have been replicated and propagated in accordance with one embodiment of the present invention;

FIG. 5 is a flow diagram showing in greater detail step 304 of FIG. 3 describing the process of the query processor deciphering the formatted message once it is received in accordance with one embodiment of the present invention;

FIG. 6 is a flow diagram showing in greater detail step 306 of FIG. 3 describing a process of creating an output data structure in accordance with one embodiment of the present invention;

DETAILED DESCRIPTION OF THE INVENTION

Figure 2:
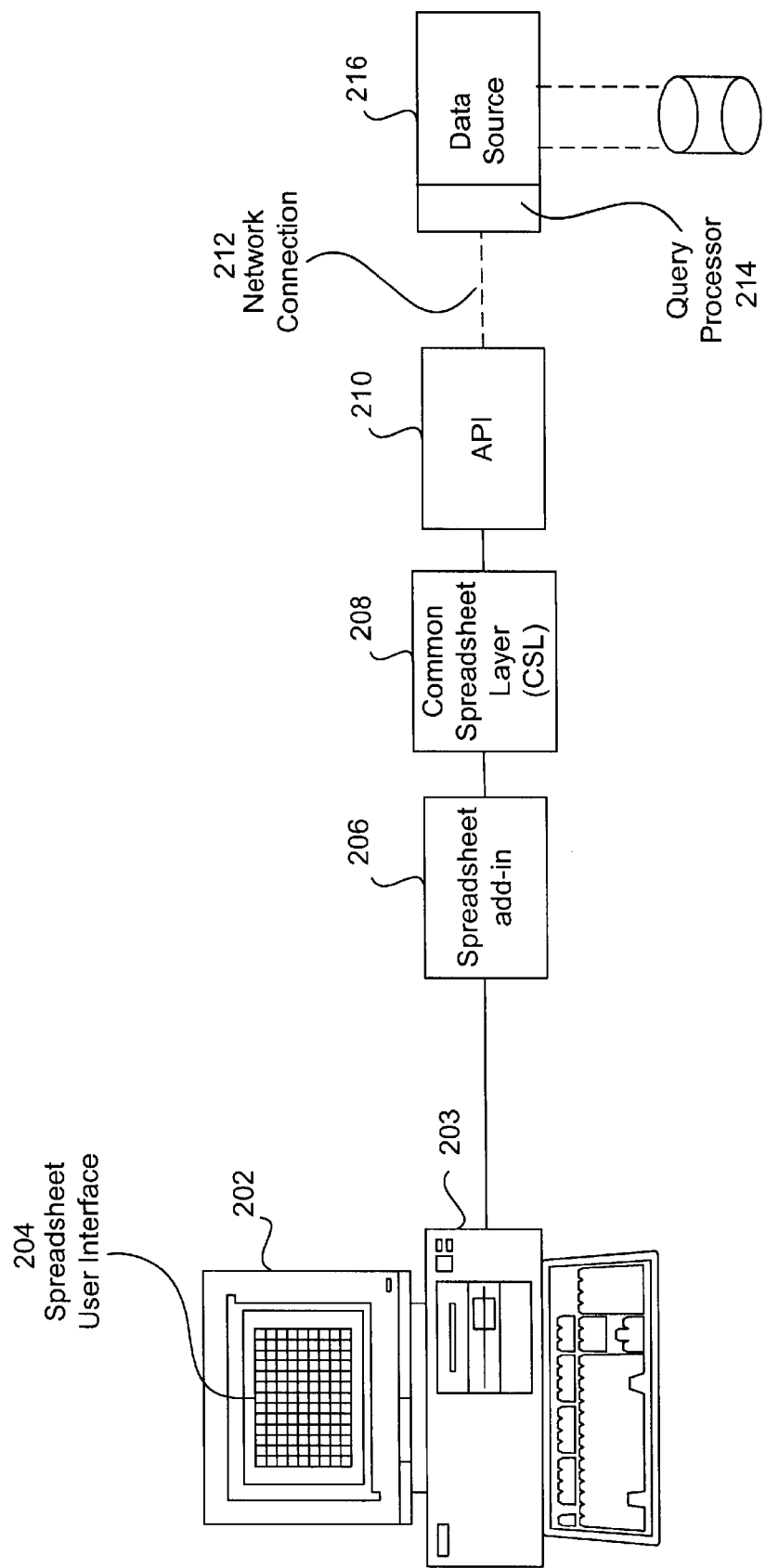
FIG. 2 is a block diagram showing components of a data retrieval system in accordance with one embodiment of the present invention.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A method and system for replicating and propagating formulas and data relationships in a user interface associated with multidimensional data, thereby reducing input from a user, are described in the various figures. The user interface of the present invention is described below using a spreadsheet paradigm that is separate or distinguishable from the multidimensional data. The spreadsheet format (i.e., a grid or cell-based format) is beneficial in that there is a large base of users who are already familiar with the typical spreadsheet interface (e.g. Microsoft Excel or Lotus 1-2-3). The user interface of the present invention utilizes the spreadsheet interface and allows users to retrieve and manipulate multidimensional data. It also allows them to easily navigate through such data. The concept of navigating through data is unique to the multidimensional or OLAP paradigm. Users can get various perspectives of the same data at a particular level or can go to different levels of data granularity by using keystrokes or user input via the spreadsheet program. The user can load large volumes of multidimensional data directly into a spreadsheet and begin analyzing, navigating, and changing perspectives on the data immediately without having to learn an entirely new user interface. However, it should be understood that the user interface of the present invention is not limited to the spreadsheet paradigm.

Users often want to create formulas or relationships among data using existing values in a multidimensional database and have those results displayed in a spreadsheet. For example, keying in a formula such as C5=(B6*C6)/B5 is, of course, necessary at least once since only the user knows formula. However, having to key in the same formula using different cell numbers but expressing the same relationship among other data values multiple times is tedious, inefficient, and error prone. It would be useful and efficient for a multidimensional query processor, also referred to as a data view manager to replicate and propagate the same formula in other cells in the spreadsheet based on the first time the user inputs the formula. This feature is illustrated in FIGS. 1A through 1C.

FIG. 1A is a screen display of a spreadsheet user interface containing multidimensional data from a data source. The data shows Sales figures for four quarters and the entire year at cell B5 through cell F5. Similarly, the data shows other data, such as cost of goods sold (COGS), Margin and Total Expenses for each quarter and the year in columns B through F. In the described embodiment, data in the cells are stored in a multidimensional database. In other embodiments, other types of data stores such as relational databases or flat files can be used to store the actual data. However, the data is combined, formatted, and retrieved in a multidimensional format. In these embodiments, an interface customized to the particular type of data store is used to combine and format the relational or flat data into a multidimensional format. For example, data from relational sources would need to be transformed into a multidimensional cube before it can be retrieved multidimensionally. One software tool capable of doing this is the Hyperion Integration Server available from Hyperion Solutions Corporation. FIG. 1B is a screen display of the spreadsheet user interface shown in FIG. 1A after having inserted a formula. A formula 102, expressed as C6=B6/B5, is keyed in by the user and the result 104 is displayed in cell C6. Similarly, the user inputs a formula (not shown), for Margin (C7=B7/B5) and Total Expenses (C8=B8/B5), thereby creating a new column to hold these values and shifting the values from "Qtr2" over one column. The same formula is inputted by the user for the other three quarters thereby creating columns E, G, and I holding values of the ratio of each data row compared to Sales. Thus far, the user has manually input the necessary formulas into the spreadsheet. The methods and systems of the present invention determine whether data cells in the spreadsheet are sources from an underlying data store or contain user-defined spreadsheet formulas, such as the ones discussed above (e.g., C7=B7/B5).

FIG. 1C is another screen display of the spreadsheet user interface shown in FIG. 1B after the user has navigated through the data and after formulas entered by the user have been replicated and propagated in accordance with one embodiment of the present invention. Having started with the higher data level shown in FIG. 1A and the formula-enhanced data view of FIG. 1B, the user performs a data navigation operation to obtain a different perspective of the data. In the case illustrated in FIG. 1C, the user performed a zoom-in or drill-down operation resulting in a more detailed display of the same Sales and Expenses data shown in FIGS. 1A and 1B. As will be shown below, the present invention interprets any user formulas, their multidimensional context, and the data navigation request made by the user.

In FIG. 1C, the user performed a multidimensional navigation operation by zooming in on the next level of Market thereby creating sub-categories of market regions shown in column A 106, namely East, West, South, and Central. The user has obtained another perspective of the multidimensional data that already existed in the database. That is, Sales, COGS, Margin and Total Expense figures for each of the regions already exist as data values in the database. However, also included in the output are all the formulas entered by the user in FIG. 1B. As shown in column D 108, for example, are values corresponding to the formulas entered by the user except now they are replicated for each regional market. This was done without the user having to enter any additional formulas. The processes of the present invention interpret the context of the user-entered formulas and, while the user navigates through the data, propagates the formulas to the appropriate cell while adjusting the cells numbers accordingly.

As shown in FIG. 1C, all the values that were of interest to the user at the entire market level (ratios of COGS, Margin and Total Expenses to Sales) are replicated automatically for the user for each of the regional markets. In the described embodiment of the present invention, the processes performed according to the present invention assumed from the context of the original formulas that the user would very likely desire to have the same formulas for each regional market. The processes for determining the context and propagating the formulas are described in greater detail below. The automatic propagation of the formulas saves the user from having to manually enter the formulas for each of the markets. In the described embodiment, the user can choose not to have the formulas propagated and replicated, in which case columns D, F, H, and J would not contain formula values. It is also worth noting that column A is now used to hold labels of the regional markets, thereby causing all data values and formulas (and the cell designations in the formulas) to be shifted accordingly.

FIG. 2 is a block diagram showing components of a data retrieval system in accordance with one embodiment of the present invention. At the front end of the data retrieval system is a display monitor 202 of a computer 203, such as a client computer or a network computer. Shown on display monitor 202 is a spreadsheet user interface 204. Typical spreadsheet programs are Excel from Microsoft Corporation of Redmond, Wash. and Lotus 1-2-3 from IBM Corporation of Armonk, N.Y. The spreadsheet program can also be a generic or customized grid comprised of rows and columns of cells used to hold data, strings, and formulas. The spreadsheet program typically runs or executes on the computer 203. Spreadsheet add-in programs 206 are modules that allow third-parties or users to write into the spreadsheet program additional functionality. In the described embodiment, the formula propagation and preservation features being added to the spreadsheet user interface can be seen as a significant "add-in" to the spreadsheet program.

In the described embodiment, a common spreadsheet layer (CSL) 208 accepts data either from the spreadsheet program or from the back end of a data retrieval system (discussed below) and performs any necessary conversions regarding data format. When accepting data from the spreadsheet, CSL 208 converts the spreadsheet data, as well as other data components discussed below, into a condensed or compact data representation. In the described embodiment, this compact data representation is in binary format. The exact format of the data representation depends on the type of data source being used. When accepting data from the back end, CSL 208 converts the compacted data representation to a form suitable for the particular spreadsheet program being used.

Application Programming Interface (API) 210 lies between CSL 208 and a network connection 212. API 210 can be any suitable application programming interface based on the spreadsheet program being used and the type of network. At the back end of the data retrieval system are a query processor or data view manager 214 and a data source 216. Query processor 214 receives and transmits the compact data representation. Query processor 214 typically resides on a server computer attached to data source 216. In other embodiments the query processor 214 resides on a separate computer from the data source. The compact data representation is analyzed (when received) or created (when transmitting) by query processor 214. The functions of query processor 214 are described in greater detail in FIG. 8 below. Data source 216 is any suitable data storage area that holds the data displayed by the spreadsheet user interface 204. In the described embodiment, data source 216 is a multidimensional data source such as Essbase from Hyperion Solutions Corporation of Sunnyvale, Calif. In another embodiment, data source 216 can be a relational database such as DB2 from IBM Corporation or simply be flat files. In another embodiment, CSL 208, query processor 214, and data source 216 can all reside on computer 203.

Figures 3, 4:
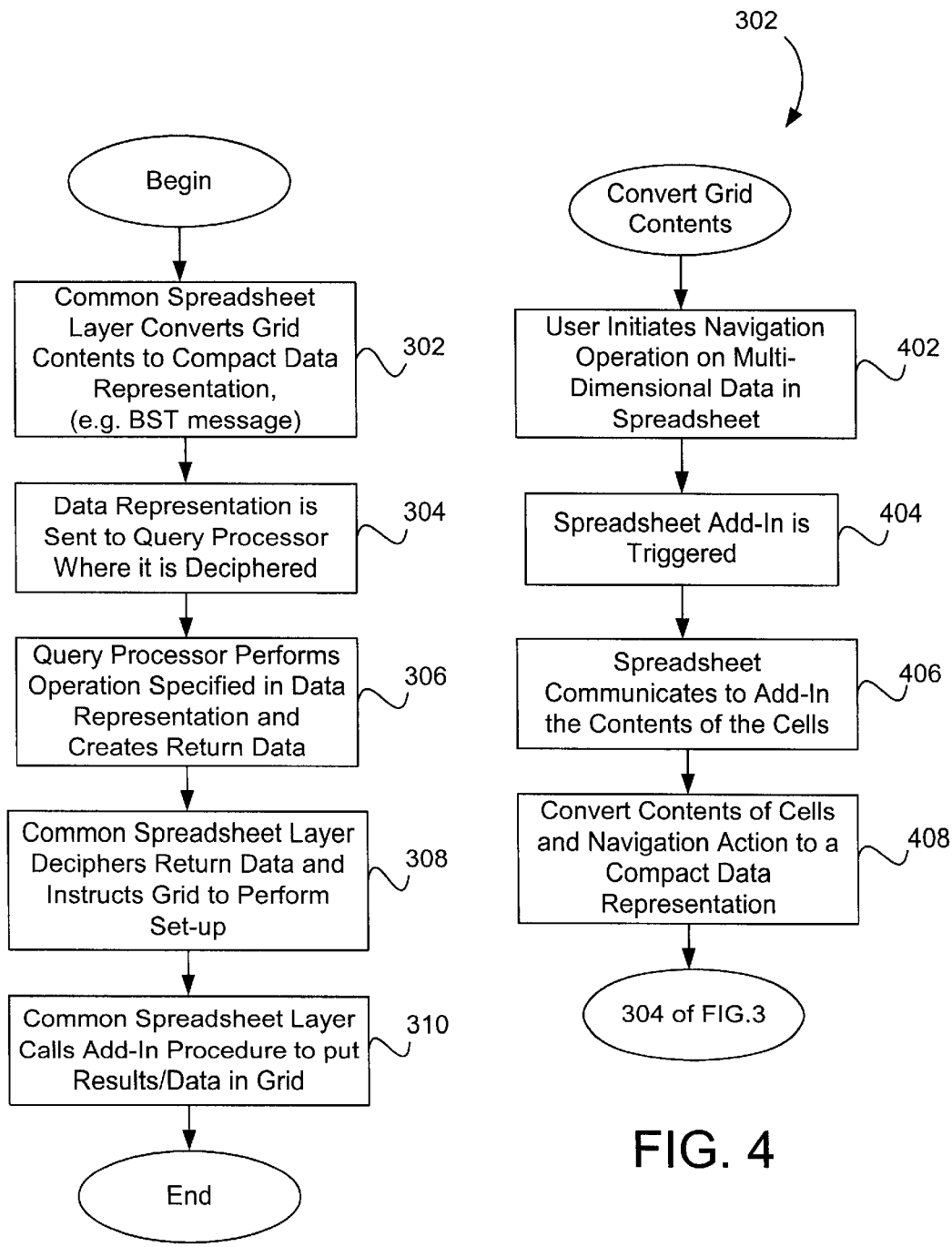
FIG. 3 is a flow diagram showing a process of retrieving data from a data source and propagating user-created formulas in an associated user interface in accordance with one embodiment of the present invention.
FIG. 4 is a flow diagram showing in greater detail step 302 of FIG. 3 describing in further detail preliminary steps taken before a condensed formatted message is created in accordance with one embodiment of the present invention.

FIG. 3 is a flow diagram showing a process of retrieving data from a data source and propagating user-created formulas in a spreadsheet user interface in accordance with one embodiment of the present invention. At step 302 a CSL (e.g., CSL 208) converts grid content from a spreadsheet to a format recognizable to the data source. In general, the format is a compact data representation. In the described embodiment, the format is a binary spreadsheet table, or BST, a proprietary format from Hyperion Solutions Corporation. In other embodiments, formats other than BST in which the data is formatted and condensed in a manner recognizable to the data source can be used. In the described embodiment, a BST message consists of the data in the spreadsheet, including strings such as labels, a representation of the user navigation action, and action modifiers referred to as options, such as Formula Fill, indicating that formulas should be preserved and replicated. By converting to a BST message, the data source of the described embodiment will understand what the user wants to do and whether any formulas have been entered by the user. Step 302 is described in greater detail below with reference to FIG. 4.

The data source in the described embodiment, as discussed in FIG. 2, is a multidimensional database, such as Essbase from Hyperion Solutions Corporation. In other embodiments, the underlying data source does not have to be multidimensional. For example, a relational database or flat files can also be used to store the data. The automatic formula replication and propagation in a spreadsheet format of the present invention can be implemented on any appropriate underlying data source if the data is converted to a multidimensional cube, using a software tool such as the Hyperion Integration Server. At step 304 the BST message is transmitted to a data source through an API (e.g. API 210) and a network, and is deciphered by a data source(e.g. data source 216). In particular, a query processor (e.g. query processor 214) decodes the user navigation action and also determines whether the user has entered any formulas in the spreadsheet. At step 306 the query processor performs the operations specified in the BST message, specifically the navigation operation specified by the user, and creates a return BST message or, in other embodiments, a return compact data representation. The return compact data representation is obtained from the data source 216 and contains the new grid content to be displayed in the spreadsheet (based on the user navigation operation) and additional logic for preserving and replicating formulas if specified by the user. This additional logic includes the number of rows and columns that need to be inserted to accommodate formula propagation and the locations of those rows and columns. Steps 304 and 306 are described in greater detail below with reference to FIG. 5.

At step 308 the CSL deciphers the return BST message from the query processor and instructs the spreadsheet to perform any necessary insertions or deletions of rows and columns according to formula preservation and replication. The CSL gives this "blueprint" to the spreadsheet so that any additional data can be displayed. At step 310 the CSL calls add-in procedures to place the results and content in the spreadsheet (or grid). In the described embodiment, add-in procedures are components or modules of the present invention that are needed to communicate data with the underlying spreadsheet. Many commercial software applications have add-in modules so that external programs can communicate with the spreadsheet. The add-in procedures are a toolkit that allow users to expand on the functionality of the spreadsheet. In the described embodiment, the data communicated is the blueprint of what needs to be done based on the user formulas and user navigation operations. If formula preservation is not ON, the contents of the cells is replaced cell by cell and no blueprint is needed. If formula preservation is ON, insert/delete/paste instructions in the blueprint are performed first before the contents of the cells are replaced cell by cell. The blueprint and how it is created is discussed in greater detail below.

FIG. 4 is a flow diagram showing in greater detail step 302 of FIG. 3 in accordance with one embodiment of the present invention. FIG. 4 describes in further detail preliminary steps taken before a compact data representative, such as in BST message, is created. At step 402 the user performs either a menu operation or a mouse operation using the spreadsheet user interface to initiate a data navigational action. A few examples of data navigational actions are zoom-in, zoom-out, and refresh. Once the user enters a navigational action, the spreadsheet add-in is triggered at step 404. At step 406, closely related to step 404, the spreadsheet transmits to the add-in program the contents of the cells. The content transmitted is generally data strings (e.g. column or row labels), the actual data, and NULLS for empty cells.

At step 408 the CSL converts the transmitted spreadsheet input grid contents and the navigation action into an efficient compact data representative,(e.g. a BST message). In the described embodiment, the contents of the input grid are read and replaced into a two-dimensional array of cells where each cell contains a structure. Each structure specifies the type of each cell in the input grid (e.g., string, NULL, integer, double, etc.), the value of the cell (e.g. "MARKET", 23460, etc.), and the location of the cell represented by the structure. This two-dimensional array of structures (within the cells) is the compact data representation.

FIG. 5 is a flow diagram showing step 304 of FIG. 3 in greater detail in accordance with one embodiment of the present invention. FIG. 5 describes the process of the query processor deciphering the compact data representation once it is received. At step 502 the query processor receives the compact data representative in an appropriate protocol, such as BST in the described embodiment. At step 504 the query processor transforms or translates the data in the data representation into a row and column structure. The operation of the query processor in this regard is described further below with reference to FIGS. 9A and 9B. At step 506 the query processor determines what operation or navigational action was performed by the user. Depending on the navigational action, at step 508 the query processor manipulates the row and column structures created at step 504 to reflect the navigational action. In the described embodiment, the two structures are manipulated, if necessary, by examining an outline of the multidimensional data as described in FIG. 9C. Based on the outline, the query processor determines what data to return. For example, referring to FIGS. 1A to 1C, the outline structures contain data that the query processor uses to determine what the next level of detail down (zoom-in) from Market is, which in this case, are the different regional markets. The regional markets (East, West, South, etc.) are children of a parent Market level. These relationships are described in greater detail below.

At step 510 the query processor checks options set by the user. Specifically, it checks options regarding formula preservation, such as retain formulas on retrieval or retain formulas on zoom operations. If the user chose options to preserve formulas during data navigation, the query processor will return a blueprint even if there were no formulas. In other embodiments, a blueprint may not be created if the query processor detects that there were no formulas in the input grid. At step 510, the data source informs the CSL how much space (ie. number of rows and columns) will be needed to replicate the formulas. For example, if a particular row containing a formula needs to be replicated, the row is copied and then pasted the required number of times. Through this operation, the space for the additional formula is created.

FIG. 6 is a flow diagram showing in greater detail step 306 of FIG. 3 in accordance with one embodiment of the present invention. FIG. 6 describes a process of creating a return data representative. In the described embodiment, this return data representative is created by the query processor and is sent to the CSL. At step 602 the query processor checks the outline of the multidimensional data for relationships, such as parent-child relationships. This step is described in greater detail below with reference to FIG. 8. At step 604 the query processor checks the options as in step 510 and creates a blueprint reflecting the formula preservation options. In the described embodiment, the blueprint for preserving (in the case of simply refreshing the spreadsheet) or propagating formulas (such as when zooming in on a view) contains information such as whether to cut or copy formulas, the number of rows and columns to be inserted, and their columns. Step 604 is described in greater detail below with reference to FIG. 8. At step 606 the query processor converts the blueprint created in step 604 and the actual data into a compact return data representation, such as in BST format in the described embodiment. This return data representation is then sent to the CSL at step 608.

Figure 7:
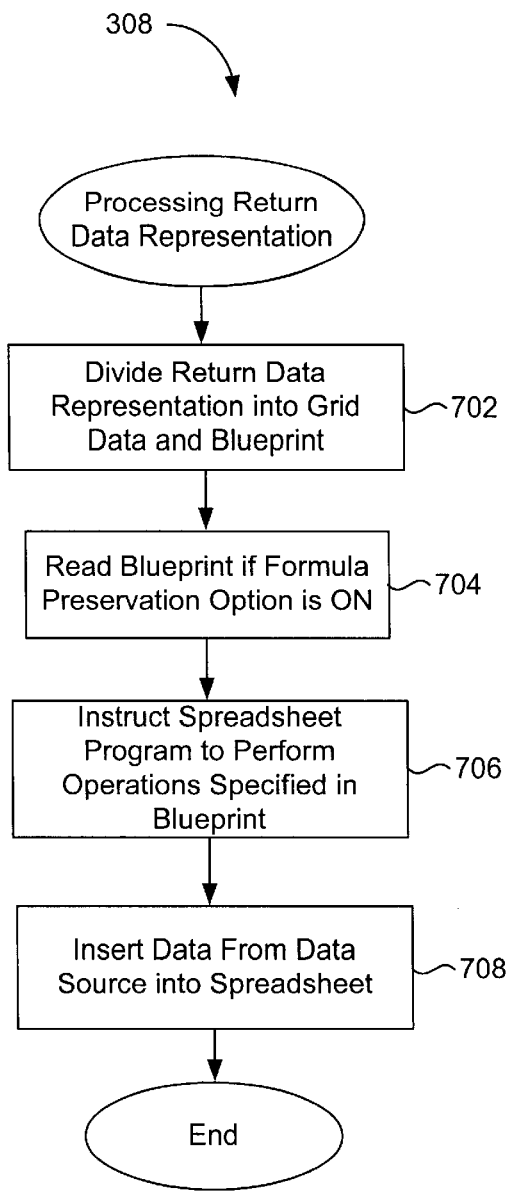
FIG. 7 is a flow diagram showing in greater detail step 308 of FIG. 3 describing a process of the Common Spreadsheet Layer (CSL) receiving and processing the returned condensed formatted message from the data source in accordance with one embodiment of the present invention.

FIG. 7 is a flow diagram showing in greater detail step 308 of FIG. 3 in accordance with one embodiment of the present invention. FIG. 7 describes a process of the CSL receiving and processing the compact data representation from the query processor referred to in step 606 of FIG. 6. At step 702 the CSL divides the compact data representation into separate components. In the described embodiment, the compact data representation is split into at least two parts: grid data and a blueprint. At step 704 the program determines whether the formula preservation option is ON. If so, the program reads the blueprint created in step 604 indicating formula preservation options. As described above, the blueprint contains information such as whether to copy or cut columns and rows, how many, and locations. If the formula preservation option is not ON, there is no blueprint and the program skips this step.

At step 706 spreadsheet add-in modules perform the operations in the spreadsheet that are specified in the blueprint. In the described embodiment these operations include inserting and deleting rows and columns, and cutting and pasting a region. The blueprint is essentially a combination of these insertion and deletion instructions with further information regarding locations as to where they should occur. At this stage the spreadsheet has the right number of rows and columns to fit the new data contents returned by the data source. At step 708 the add-in modules fill the newly configured spreadsheet with the actual data from the data source according to the data navigation action made by the user. At this stage the process of formula preservation and retrieving data into the spreadsheet is complete.

Figure 8:
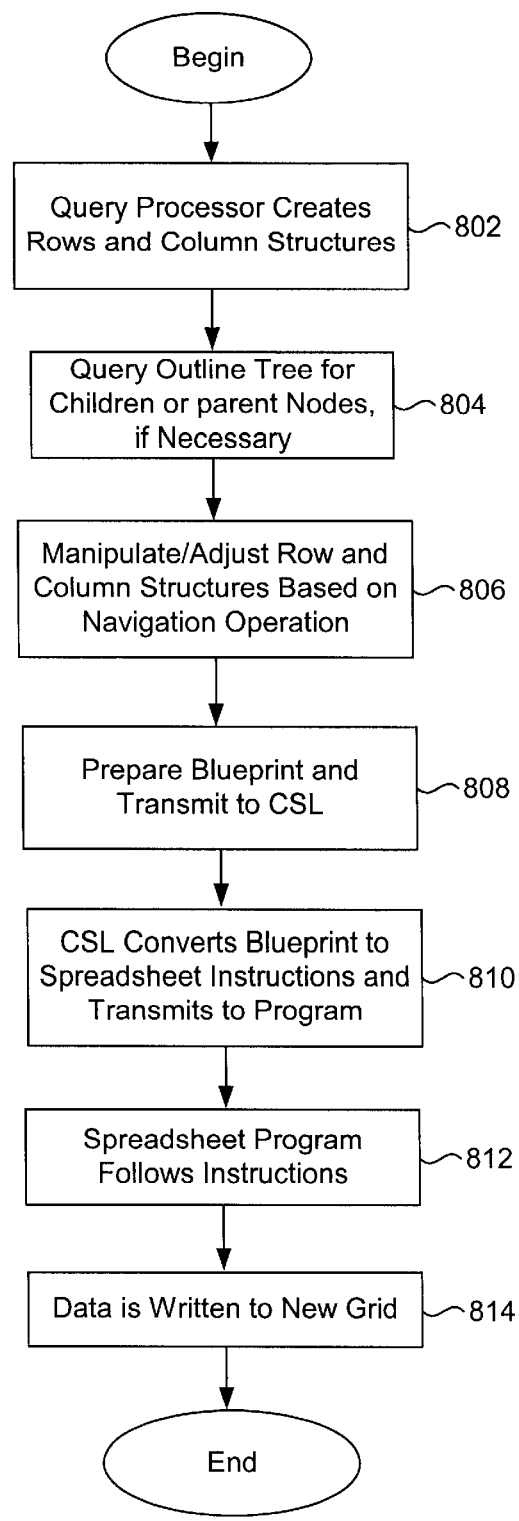
FIG. 8 is a flow diagram showing a process of creating a return data representation including a blueprint of instructions to be carried out by a spreadsheet program in accordance with one embodiment of the present invention.

FIG. 8 is a flow diagram showing a process of creating a return compact data representation including a blueprint of instructions to be carried out by a spreadsheet program in accordance with one embodiment of the present invention. FIG. 8 shows in greater detail steps 602 to 606 of FIG. 6. This process occurs after the query processor receives the initial data representation from the CSL that contains the grid data, user navigation actions, and options chosen by the user. Once the initial data representation is received the query processor creates row and column structures as stated in step 802. These structures are created by reading the contents of each cell in the grid. In the described embodiment, the query processor ignores actual data in the grid and processes strings. When the query processor hits numeric or data in a cell, it does not process that cell. Techniques for this type of processing are known in the art. For example, some of the techniques rely on the fact that data in grids or spreadsheets typically start at the same column or row location. Examples of row and column structures are shown in FIGS. 9A and 9B.

Figure 9A:
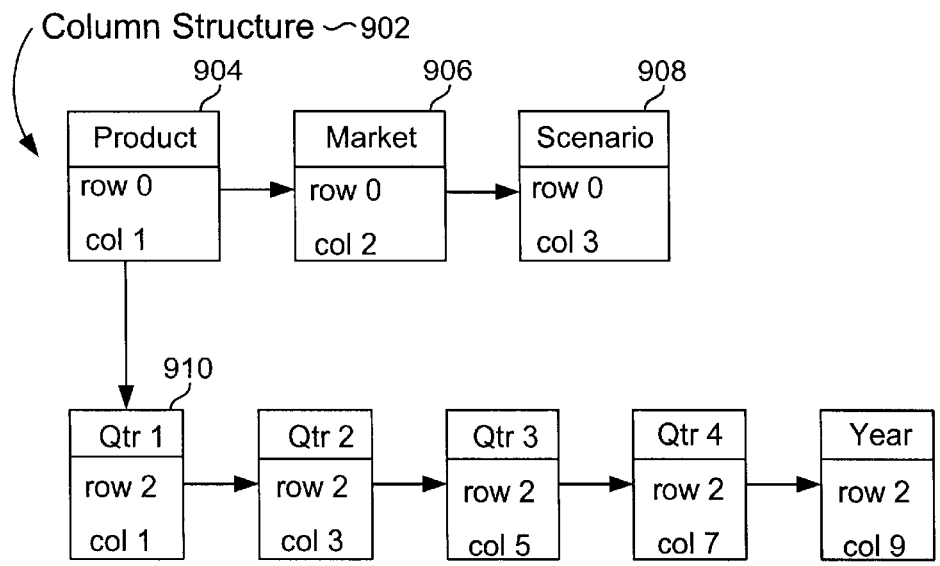
FIG. 9A is a block diagram showing a column structure containing three top level nodes corresponding to the first three data strings in the spreadsheet in accordance with one embodiment of the present invention.
Figure 9B:
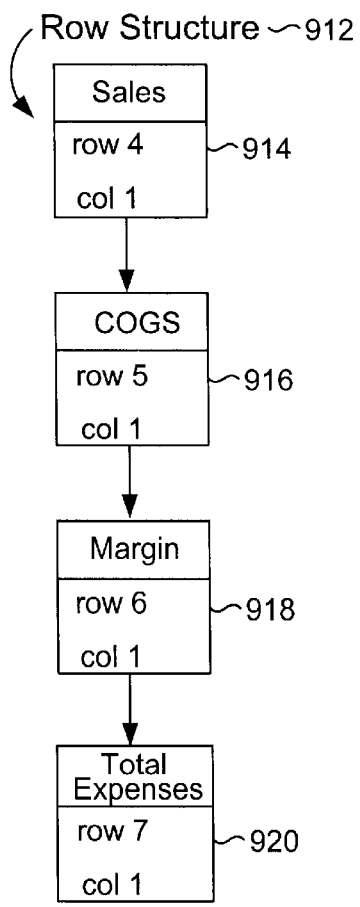
FIG. 9B is a block diagram showing a row structure containing four data nodes corresponding to the first column in FIG. 1B in accordance with one embodiment of the present invention.

FIGS. 9A and 9B are block diagrams showing sample row and column structures created from processing the spreadsheet shown in FIG. 1B in accordance with one embodiment of the present invention. FIG. 9A is a column structure 902 that contains three nodes in the first level: a Product node 904, a Market node 906, and a Scenario node 908, corresponding to the first three data strings in the spreadsheet shown in FIG. 1B. Each node contains row and column data. For example, Product node 904 contains data indicating that it starts at row 0 and column 1. The arrows between the nodes point to related nodes that are "siblings." At a next dimension (also referred to as a nested dimension) are nodes for each "Qtr" and "Year." For example, a node 910 is the "Qtr1" node that indicates that the string "Qtr1" is in a cell that begins at row 2 and column 1. Also shown are nodes for "Qtr2," "Qtr3," "Qtr4," and "year" containing corresponding location data. FIG. 9B is a row structure 912 that contains four nodes: a Sales node 914, a COGS node 916, a Margin node 918, and a Total Expenses node 920. As with column structure 902, each node in row structure 912 contains row and column data. Row structure 912 contains nodes that have next dimensions but that do not have siblings.

Figure 9C:
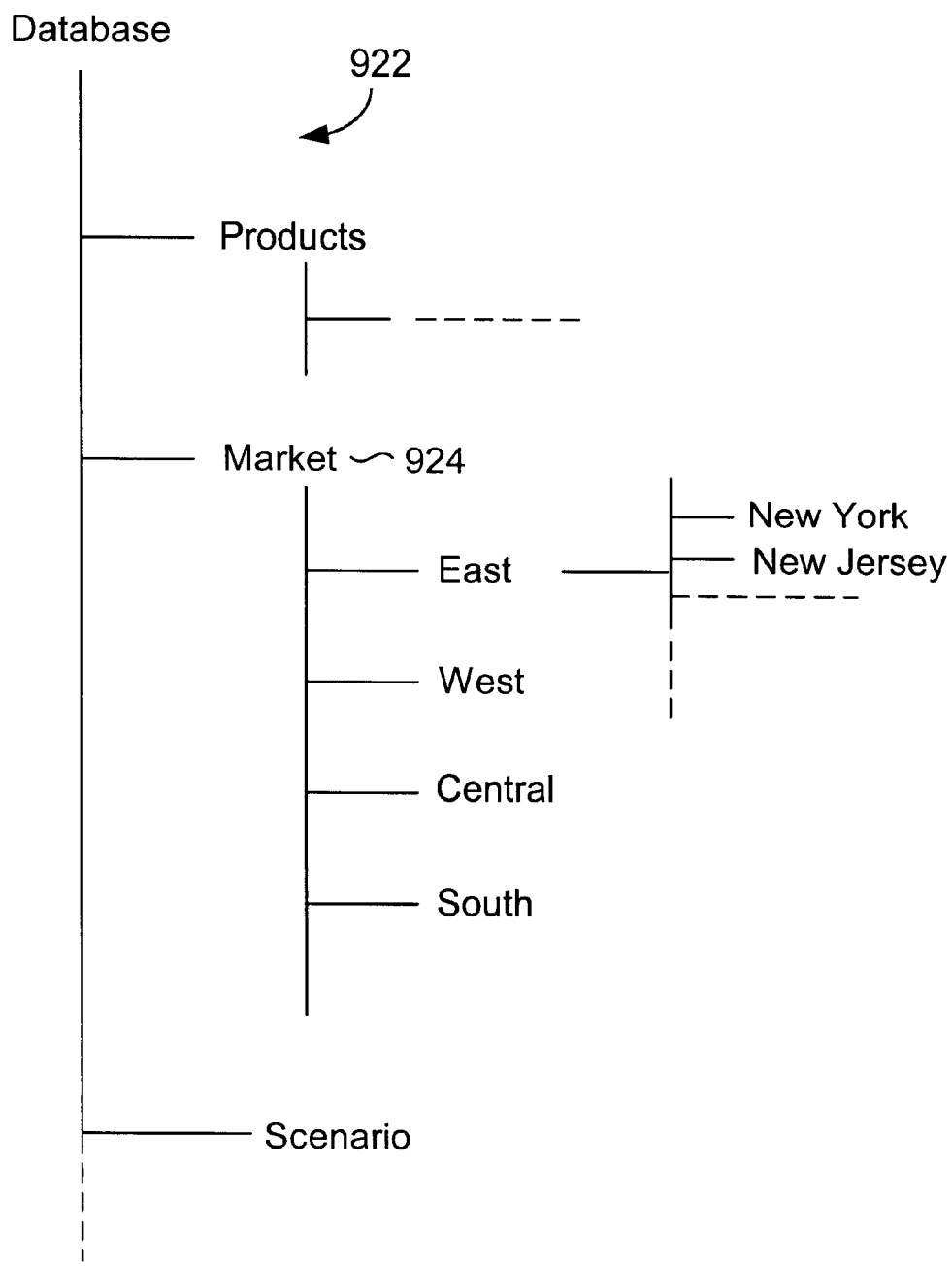
FIG. 9C is a schematic diagram of a data outline showing the hierarchy of multidimensional data displayed in FIG. 1C.

Returning to FIG. 8, step 804 the query processor examines an outline tree for children or parent nodes of the data item selected in the spreadsheet. For example, if the user navigation operation is a zoom-in (also referred to as drill-down) on a particular data item or member, the query processor checks an outline tree representing the hierarchy of the multidimensional data for any children nodes. Similarly, if the operation is a zoom-out, the query processor will check for one or more parent nodes. For retrieve or refresh operations, the query processor may not need to check the data outline. FIG. 9C is a schematic diagram of a data outline showing the hierarchy of multidimensional data. The data shown reflects the data displayed in FIG. 1C. Data outline 922 is a hierarchical tree that shows at a top dimension PRODUCT, MARKET, and SCENARIO. A member MARKET 924 has four children: EAST, WEST, CENTRAL, and SOUTH. Each of these members can also have children nodes as shown for EAST. Thus when a zoom-in operation is performed on MARKET in FIG. 1B, all of MARKETS's children are returned to the spreadsheet automatically. In the described embodiment, the data outline 922 or hierarchical tree resides on the data source 216.

Once the data outline has been examined, the query processor manipulates or adjusts the row and column structures according to the navigation operation chosen by the user at step 806. Based on the user navigation operation, the column and row counts in the nodes of structures 902 and 912 are adjusted based on whether any rows or columns are inserted or deleted. Using FIGS. 1A to 1C as examples, since the user zoomed -in on MARKET, the MARKET node is removed from the row structure and its children are inserted in the column structure corresponding to the spreadsheet. As a result, the column and row numbers of nodes in the column structure need to be adjusted to reflect the addition of a new column. The new column is column A shown in FIG. 1C. Because this new column will eventually be displayed in the spreadsheet program, the row and column structures must first be updated. Conversely, if the user were to zoom-out from one of the MARKET children, such as SOUTH, a column would be deleted and all the columns would be shifted over to the left, as shown in FIGS. 1A and 1B. Thus the row and column counts in both structures are adjusted based on whether a data item chosen by the user has children or parents as indicated in the data outline. It is also based on whether there are user-created formulas in the spreadsheet.

At step 808 the query processor prepares a blueprint of spreadsheet instructions and transmits the blueprint to CSL 208 for conversion. In the described embodiment the blueprint is an instruction set directed to the spreadsheet program instructing it to perform certain operations to set-up the spreadsheet grid so that it can accommodate the multidimensional data Referring to FIGS. 1B and 1C, the blueprint would contain instructions to insert one column at column 1 (or column A in the spreadsheet display) to accommodate the children of MARKET. In addition, twelve additional rows (beyond the four existing rows) must be inserted to hold Sales, COGS, Margin, and Total Expense data for each of the four regions. In the described embodiment, this is stated as inserting three new regions of four rows into the spreadsheet starting at row 1. The location of the insertions and deletions must also be specified in the blueprint so that the spreadsheet knows where to perform the instructions. This information, derived from the data outline 922, reflected in row and column structures 902 and 912, is inserted in the blueprint that is eventually read, after being converted, by the spreadsheet program. Once the query processor prepares the blueprint, it is transmitted to the CSL along with the data from the data source.

At step 810 the CSL converts the return compact data representation that includes the blueprint and the grid data to a form that can be interpreted by the spreadsheet add-in which in turn communicates with the spreadsheet. The spreadsheet instructions are transmitted to the add-in modules which send them to the actual spreadsheet program for execution. At step 812 the spreadsheet program executes any insert and delete row and column instructions needed to configure the spreadsheet so that it can accommodate the incoming data. At step 814 the data converted by the CSL from the return data representation is loaded or inserted into the newly configured spreadsheet.

Figure 10:
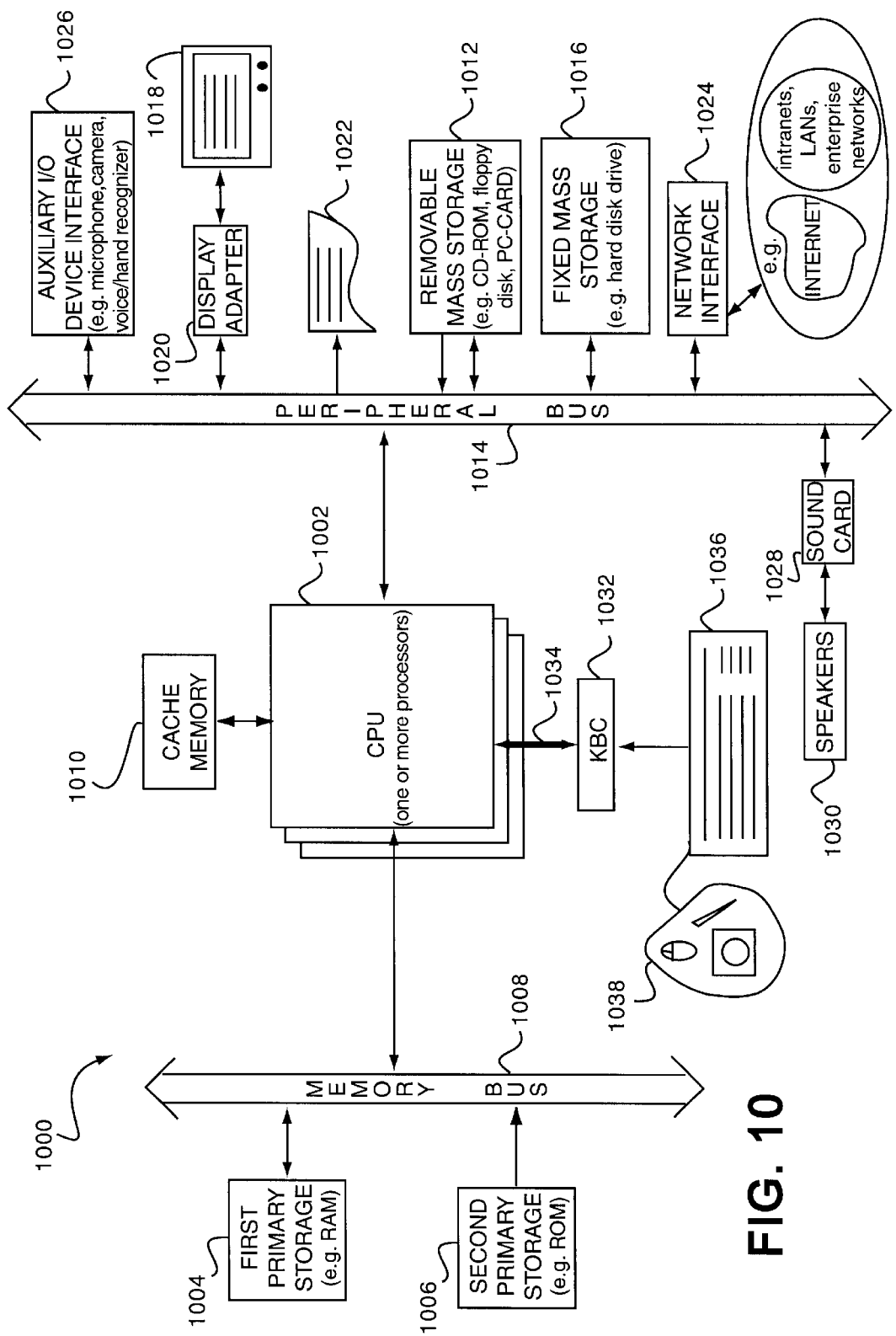
FIG. 10 is a block diagram of a typical computer system suitable for implementing one embodiment of the present invention.

In the described embodiment, the query processor, the spreadsheet and the CSL (common spreadsheet layer) can run on a general-purpose computer, such as a server or client computer in a network configuration. FIG. 10 and the related description below describes a computer-implemented embodiment of the present invention. As discussed above, the programs and processes of the present invention employ various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, extracting, producing, identifying, running, determining, comparing, executing, downloading, or detecting. It is sometimes convenient, principally for reasons of common usage, to refer to these electrical or magnetic signals as bits, values, elements, variables, characters, data, or the like. It should be remembered, however, that all of these and similar terms are to be associated with the appropriate physical quantities and are merely convenient labels applied to these quantities.

The present invention also relates to devices, systems or apparatus for performing the aforementioned operations. A system can be specially constructed for the required purposes, or it can be a general purpose computer selectively activated or configured by a computer program, such as the query processor program, stored in the computer. The processes presented above are not inherently related to any particular computer or other computing apparatus. In particular, various general purpose computers can be used with programs written in accordance with the teachings herein, or, alternatively, it may be more convenient to construct a more specialized computer system to perform the required operations, such as querying the data source or converting and interpreting the initial and return data representation.

FIG. 10 is a block diagram of a general purpose computer system 1000 suitable for carrying out the processing in accordance with one embodiment of the present invention. FIG. 10 illustrates one embodiment of a general purpose computer system. Other computer system architectures and configurations can be used for carrying out the processing of the present invention. Computer system 1000, made up of various subsystems described below, includes at least one microprocessor subsystem (also referred to as a central processing unit, or CPU) 1002. That is, CPU 1002 can be implemented by a single-chip processor or by multiple processors. CPU 1002 is a general purpose digital processor which controls the operation of the computer system 1000. Using instructions retrieved from memory, the CPU 1002 controls the reception and manipulation of input data, and the output and display of data on output devices.

CPU 1002 is coupled bi-directionally with a first primary storage 1004, typically a random access memory (RAM), and uni-directionally with a second primary storage area 1006, typically a read-only memory (ROM), via a memory bus 1008. As is well known in the art, primary storage 1004 can be used as a general storage area and as scratch-pad memory, and can also be used to store input data and processed data. It can also store programming instructions and data, in the form of a message store in addition to other data and instructions for processes operating on CPU 1002, and is typically used for fast transfer of data and instructions in a bidirectional manner over the memory bus 1008. Also well known in the art, primary storage 1006 typically includes basic operating instructions, program code, data and objects used by the CPU 1002 to perform its functions. Primary storage devices 1004 and 1006 may include any suitable computer-readable storage media, described below, depending on whether, for example, data access needs to be bidirectional or unidirectional. CPU 1002 can also directly and very rapidly retrieve and store frequently needed data in a cache memory 1010.

A removable mass storage device 1012 provides additional data storage capacity for the computer system 1000, and is coupled either bi-directionally or uni-directionally to CPU 1002 via a peripheral bus 1014. For example, a specific removable mass storage device commonly known as a CD-ROM typically passes data uni-directionally to the CPU 1002, whereas a floppy disk can pass data bi-directionally to the CPU 1002. Storage 1012 may also include computer-readable media such as magnetic tape, flash memory, signals embodied on a carrier wave, PC-CARDS, portable mass storage devices, holographic storage devices, and other storage devices. A fixed mass storage 1016 also provides additional data storage capacity and is coupled bi-directionally to CPU 1002 via peripheral bus 1014. The most common example of mass storage 1016 is a hard disk drive. Generally, access to these media is slower than access to primary storages 1004 and 1006. Mass storage 1012 and 1016 generally store additional programming instructions, data, and the like that typically are not in active use by the CPU 1002. It will be appreciated that the information retained within mass storage 1012 and 1016 may be incorporated, if needed, in standard fashion as part of primary storage 1004 (e.g. RAM) as virtual memory.

In addition to providing CPU 1002 access to storage subsystems, the peripheral bus 1014 is used to provide access to other subsystems and devices as well. In the described embodiment, these include a display monitor 1018 and adapter 1020, a printer device 1022, a network interface 1024, an auxiliary input/output device interface 1026, a sound card 1028 and speakers 1030, and other subsystems as needed.

The network interface 1024 allows CPU 1002 to be coupled to another computer, computer network, or telecommunications network using a network connection as shown. Through the network interface 1024, it is contemplated that the CPU 1002 might receive information, e.g., data objects or program instructions, from another network, or might output information to another network in the course of performing the above-described processes. Information, often represented as a sequence of instructions to be executed on a CPU, may be received from and outputted to another network, for example, in the form of a computer data signal embodied in a carrier wave. An interface card or similar device and appropriate software implemented by CPU 1002 can be used to connect the computer system 1000 to an external network and transfer data according to standard protocols. That is, method embodiments of the present invention may execute solely upon CPU 1002, or may be performed across a network such as the Internet, intranet networks, or local area networks, in conjunction with a remote CPU that shares a portion of the processing. Additional mass storage devices (not shown) may also be connected to CPU 1002 through network interface 1024.

Auxiliary I/O device interface 1026 represents general and customized interfaces that allow the CPU 1002 to send and more typically, receive data from other devices such as microphones, touch-sensitive displays, transducer card readers, tape readers, voice or handwriting recognizers, biometrics readers, cameras, portable mass storage devices, and other computers.

Also coupled to the CPU 1002 is a keyboard controller 1032 via a local bus 1034 for receiving input from a keyboard 1036 or a pointer device 1038, and sending decoded symbols from the keyboard 1036 or pointer device 1038 to the CPU 1002. The pointer device may be a mouse, stylus, track ball, or tablet, and is useful for interacting with a graphical user interface, such as user interface 204 of the spreadsheet program.

In addition, embodiments of the present invention further relate to computer storage products with a computer readable medium that contain program code for performing various computer-implemented operations. The computer-readable medium is any data storage device that can store data which can thereafter be read by a computer system, such as data source 216 of FIG. 2. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 1008, peripheral bus 1014, and local bus 1034 are illustrative of any interconnection scheme serving to link the subsystems. For example, a local bus could be used to connect the CPU to fixed mass storage 1016 and display adapter 1020. The computer system shown in FIG. 10 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, although the invention is described as using a multidimensional data source, other types of data sources can be used to retrieve data ultimately displayed in the spreadsheet user interface. In another example, the initial and return data representations can be in any suitable format that can be interpreted by the particular spreadsheet add-in modules being used. In yet another example, it is not required that the actual data in the spreadsheet be converted to a compact data representation where the navigational operation being performed is a refresh or update of the data. Accordingly, the present embodiments are to be considered as illustrative and not restrictive, and the invention is not to be limited to the details given herein, but may be modified within the scope and equivalents of the appended claims.

What is claimed is:

1. A method of presenting data including a formula using a cell-based user interface, the method comprising:

retrieving an initial data representation of data in the cell-based user interface, the initial data representation including a representation of a user navigation operation;

determining whether the data representation contains a pre-existing, user-created formula computing a first value having a meaning in a first dimension of a multidimensional database;

creating a set of instructions to be performed by a cell-based data manipulation program associated with the cell-based user interface containing the user operation and the pre-existing, user-created formula;

creating a second data representation including updated data from a data source to be displayed in the cell-based user interface and the set of instructions to be performed by the cell-based data manipulation program; and executing the set of instructions thereby allowing the pre-existing, user-created formula to automatically replicate and propagate, such that values from the pre-existing, user-created formula are displayed in the cell-based user interface, wherein a replicated formula computes a second value having a meaning in a second dimension of the multidimensional database, wherein the first value and the second value are related.

2. A method as recited in claim 1 wherein retrieving an initial data representation of data in the cell-based user interface further comprises converting data in the cell-based user interface and the user navigation operation to a compact binary representation.

3. A method as recited in claim 2 wherein the compact binary representation is a binary spreadsheet table format.

4. A method as recited in claim 1 further comprising creating the initial data representation of data in the cell-based user interface by utilizing spreadsheet add-in modules to transmit data to a spreadsheet data and user navigation operation formatter.

5. A method as recited in claim 4 wherein the spreadsheet data and user navigation operation formatter is a common spreadsheet layer.

6. A method as recited in claim 1 wherein determining whether the data representation contains a preexisting, user-created formula further comprises detecting whether cells in the cell-based user interface contain one of either data or non-data values.

7. A method as recited in claim 1 wherein creating a set of instructions to be performed by a cell-based data manipulation program further comprises creating a row structure containing a plurality of row nodes and a column structure containing a plurality of column nodes.

8. A method as recited in claim 7 wherein each one of the plurality of row nodes contains first position data of each string at the beginning of each row in the cell-based user interface and each one of the plurality of column nodes contains second position data of each string at the beginning of each column in the cell-based user interface.

9. A method as recited in claim 8 further comprising adjusting the first position data and the second position data after examining an outline of multidimensional data.

10. A method as recited in claim 9 wherein the outline of multidimensional data contains a hierarchy of data in the form of parent-child relationships.

11. A method as recited in claim 10 wherein the first position data and the second position data for a particular node are adjusted based on whether a parent-child relationship exists for that particular node.

12. A method as recited in claim 1 wherein creating a second data representation including updated data from a data source to be displayed in the cell-based user interface and the set of instructions to be performed by the cell-based data manipulation program further comprises converting data from the data source and the set of instructions to be performed by the cell-based data manipulation program to a compact binary representation.

13. A method as recited in claim 12 wherein the set of instructions to be performed by the cell-based manipulation program is derived from a blueprint of operations needed to configure the cell-based user interface to accommodate the data.

14. A method as recited in claim 13 wherein the data is multidimensional data and the data source is a multidimensional database.

15. A method as recited in claim 1 wherein performing the set of instructions further comprises invoking add-in modules associated with the cell-based data manipulation program to enable execution of the set of instructions by the cell-based data manipulation program.

16. A method as recited in claim 1 further comprising populating the cell-based data manipulation program with multidimensional data thereby displaying it through a newly configured cell-based user interface.

17. A computer readable medium containing programmed instructions arranged to present data including a formula using a cell-based user interface, the computer readable medium including programmed instructions for:

retrieving an initial data representation of data in the cell-based user interface, the initial data representation including a representation of a user navigation operation;

determining whether the data representation contains a pre-existing, user-created formula computing a first value having a meaning in a first dimension of a multidimensional database;

creating a set of instructions to be performed by a cell-based data manipulation program associated with the cell-based user interface containing the user operation and the pre-existing, user-created formula;

creating a second data representation including updated data from a data source to be displayed in the cell-based user interface and the set of instructions to be performed by the cell-based data manipulation program; and executing the set of instructions thereby allowing the pre-existing, user-created formula to automatically replicate and propagate, such that values from the pre-existing, user-created formula are displayed in the cell-based user interface, wherein a replicated formula computes a second value having a meaning in a second dimension of the multidimensional database, wherein the first value and the second value are related.

18. A computer readable medium as recited in claim 17 wherein the programmed instructions for creating a set of instructions to be performed by a cell-based data manipulation program further comprises programmed instructions for creating a row structure containing a plurality of row nodes and a column structure containing a plurality of column nodes.

19. A computer readable medium as recited in claim 18 further comprising programmed instructions such that each one of the plurality of row nodes contains first position data of each string at the beginning of each row in the cell-based user interface and each one of the plurality of column nodes contains second position data of each string at the beginning of each column in the cell-based user interface.

20. A computer readable medium as recited in claim 18 further comprising programmed instructions for adjusting the first position data and the second position data after examining an outline of multidimensional data.

21. A computer readable medium as recited in claim 20 further comprising programmed instructions such that the outline of multidimensional data contains a hierarchy of data in the form of parent-child relationships.

22. A computer readable medium as recited in claim 21 further comprising programmed instructions such that the first position data and the second position data for a particular node is adjusted based on whether a parent-child relationship exists for that particular node.

23. A computer-implemented method for automatically propagating pre-existing, user-created formulas following a user navigation through a database capable of being viewed in a multi-dimensional manner, said computer-implemented method comprising:

(a) displaying a view of a first data set from the database, the first view of the data set containing numeric data, and at least a portion of the numeric data results from a pre-existing, user-created formula in a first dimension of a database;

(b) receiving a user navigation request with respect to the view of the first data set;

(c) determining a view of a second data set from the database, the view of the second data set containing numeric data, and at least a portion of the numeric data resulting from propagating and replicating the pre-existing, user-created formula of the view of the first data set to locations within the view of the second data set wherein a propagated formula is in a second dimension of the database and is related to the pre-existing, user-created formula; and (d) displaying the view of the second data set.

24. A computer-implemented method as recited in claim 23, wherein the first and second data sets are multi-dimensional.

25. A computer-implemented method as recited in claim 23, wherein the user navigation request is one of a zoom-in navigation request.

26. A computer-implemented method as recited in claim 23, wherein said displaying a view of a first data set from the database operates to display the first view in a grid format, and said displaying the view of the second data set operates to display the second view in a grid format.

27. A computer-implemented method as recited in claim 26, wherein the grid format is a spreadsheet grid.

28. A computer-implemented method as recited in claim 23, wherein said determining a view of a second data set from the database comprises:

forming a first data representation describing the first view and the user navigation request;

forwarding the first data representation to a data view manager;

converting, at the data view manager, the first data representation into row and column structures;

modifying, at the data view manager, the row and column structures based on the user navigation request;

determining, at the data view manager, formula propagation information for the view of the second data set with respect to the first data set; and forming a return data representation based on the modified row and column structures and the formula preservation information, the return data representation describing the view of the second data set.

29. A computer-implemented method as recited in claim 28, wherein said displaying the view of the second data set comprises:

constructing the view of the second data set in accordance with the return data representation; and populating the view of the second data set with data from the database.

30. A computer-implemented method as recited in claim 28, wherein said modifying, at the data view manager, the row and column structures, makes use of a data outline that describes the multi-dimensional nature of the database.

31. A computer-implemented method as recited in claim 28, wherein the formula preservation in formation indicates at least copy and paste operations for the pre-existing, user-created formula.

32. A computer-implemented method as recited in claim 28, wherein a spreadsheet application provides the views of the database to a user, wherein said displaying a view of a first data set from the database operates to display the first view in a spreadsheet grid format, and said displaying the view of the second data set operates to display the second view in a spreadsheet grid format, and wherein the formula preservation information are spreadsheet instructions carried-out by the spreadsheet application.

33. A method for displaying data from a multidimensional database, said method comprising the operations of:

displaying a first grid of data on a display device, the data within the first grid of data including numeric data, and at least a portion of the numeric data results from a user-created formula created in a spreadsheet program;

receiving a user navigation request with respect to the first grid of data, the user navigation request requesting a related but different dimensional view of the data displayed in the first grid of data; and displaying an altered grid of data on the display device, the altered grid of data being related to the first grid of data, the data within the altered grid of data including at least numeric data, and at least a portion of the numeric data results from propagating the user-created formula associated with the first grid of data to a plurality of different cells within the altered grid of data to provide the different dimensional view of the data wherein a propagated formula is derived according to the user-created formula.

34. A method as recited in claim 33, wherein the user navigation request is a zoom-in navigation request.

35. A method as recited in claim 33, wherein the computer program is a spreadsheet program.

36. A computer readable medium containing programmed instructions arranged to automatically propagate pre-existing, user-created formulas following a user navigation through a database capable of being viewed in a multi-dimensional manner, the computer readable medium including programmed instructions for:

(a) displaying a view of a first data set from the database, the first view of the data set containing numeric data, and at least a portion of the numeric data results from a pre-existing, user-created formula in a first dimension of a database;

(b) receiving a user navigation request with respect to the view of the first data set;

(c) determining a view of a second data set from the database, the view of the second data set containing numeric data, and at least a portion of the numeric data resulting from propagating and replicating the pre-existing, user-created formula of the view of the first data set to locations within the view of the second data set wherein a propagated formula is in a second dimension of the database and is related to the pre-existing, user-created formula; and (d) displaying the view of the second data set.

37. A computer readable medium as recited in claim 36 further comprising programmed instructions such that said determining a view of a second data set from the database further comprises programmed instructions for:

forming a first data representation describing the first view and the user navigation request;

forwarding the first data representation to a data view manager;

converting, at the data view manager, the first data representation into row and column structures;

modifying, at the data view manager, the row and column structures based on the user navigation request;

determining, at the data view manager, formula propagation information for the view of the second data set with respect to the first data set; and forming a return data representation based on the modified row and column structures and the formula preservation information, the return data representation describing the view of the second data set.

38. A computer readable medium containing programmed instructions arranged to display data from a multidimensional database, the computer readable medium including programmed instructions for:

displaying a first grid of data on a display device, the data within the first grid of data including numeric data, and at least a portion of the numeric data results from a user-created formula created in a spreadsheet program;

receiving a user navigation request with respect to the first grid of data, the user navigation request requesting a related but different dimensional view of the data displayed in the first grid of data; and displaying an altered grid of data on the display device, the altered grid of data being related to the first grid of data, the data within the altered grid of data including at least numeric data, and at least a portion of the numeric data results from propagating the user-created formula associated with the first grid of data to a plurality of different cells within the altered grid of data to provide the different dimensional view of the data wherein a propagated formula is derived according to the user-created formula.

* * * * *